United States Patent [19]

Geisthoff et al.

[11] Patent Number: 4,960,344

[45] Date of Patent: Oct. 2, 1990

[54] LOCKING MECHANISM FOR FIXING AN OUTER PART ON AN INNER PART

[75] Inventors: Hubert Geisthoff; Klaus Kämpf, both of Lohmar, Fed. Rep. of Germany

[73] Assignee: Jean Walterscheid GmbH

[21] Appl. No.: 353,350

[22] Filed: May 17, 1989

[30] Foreign Application Priority Data

Jun. 3, 1988 [DE] Fed. Rep. of Germany ....... 3818808

[51] Int. Cl.⁵ .............................................. F16B 7/00
[52] U.S. Cl. .................................... 403/316; 403/322;
403/325; 403/328; 173/125
[58] Field of Search ............... 403/322, 325, 328, 316,
403/317, 327; 172/125

[56] References Cited

U.S. PATENT DOCUMENTS

| 4,579,476 | 4/1986 | Post | 403/322 |
|---|---|---|---|
| 4,616,952 | 10/1986 | Schott | 403/325 X |
| 4,639,162 | 1/1987 | Geisthoff et al. | 403/325 X |
| 4,639,163 | 1/1987 | Buthe et al. | 403/322 |

Primary Examiner—Andrew V. Kundrat
Assistant Examiner—Carol I. Bordas
Attorney, Agent, or Firm—Toren, McGeady & Associates

[57] ABSTRACT

A locking mechanism for fixing an outer part (5) on an inner part (4) having locking members (8) which are guided in apertures (7) of the outer part so as to be radially movable in a limited way. In the locking position, these locking members (8) are supported radially outwardly on a locking ring (10). A control ring (16) retains the locking ring in the open position. For this purpose, the control ring (16) is displaced eccentrically and is supported on a stop (19) associated with the outer part (5). By inserting the inner part (4), the control ring (16) is aligned coaxially by the control members (8) so that a spring (12) loading the locking ring (10) can act to move the control ring (16) across the stop (19) so that the locking position is achieved.

13 Claims, 5 Drawing Sheets

LOCKING MECHANISM FOR FIXING AN OUTER PART ON AN INNER PART

BACKGROUND OF THE INVENTION

1. Field of the Invention

This invention relates to a locking mechanism for fixing an outer part on an inner part, especially the coupling sleeve of a driveshaft of an agricultural implement to the power take-off shaft of a tractor, the locking mechanism comprising locking members which are guided in apertures in the outer part so as to be movable in a radially limited way and which, in the locked position, are supported in a radially outwardly direction on an inner bore face of a movable locking ring of the locking mechanism, which locking ring is loaded by the force of a spring of the locking mechanism into the locking position, the spring acting on the one hand on the outer part and on the other hand on the locking ring, the locking members extending radially inwardly from the apertures into a receiving bore of the outer part and projecting, for fixing purposes, into a recess in the inner part, and the locking mechanism also comprising means for retaining the locking ring in an open position clear of the apertures for the locking members and for automatically cancelling the retention when the inner part is introduced into the receiving bore of the outer part.

2. Description of Prior Art

For example, from the German Patent Specification No. 34 08 852 a locking mechanism retainable in the open position is known in which the receiving bore of a coupling sleeve accommodates a supporting ring which is loaded by the force of a spring in the direction of the apertures. When a power take-off shaft is disconnected from the coupling sleeve, this supporting ring is positioned in the region of the apertures and prevents the locking members (designed as balls) from moving radially inwardly. It holds, therefore, locking members in the radially outward position, wherein the locking members, as a kind of stop, prevent the locking ring from being moved under the spring force into the region of the apertures. When inserting the power take-off shaft into the receiving bore of the coupling sleeve, the power take-off shaft causes the supporting ring to be moved further into the bore of the coupling sleeve, as a result of which the supporting ring releases the locking members enabling them to fall radially inwardly into the locking recess provided in the power take-off shaft and subsequently permitting a displacement of the locking ring by means of the locking members. The disadvantage of this design is that the receiving bore of the supporting sleeve additionally has to be provided with a supporting ring which takes on a locking function in the open position. This results in a complicated design and, in addition, the force of the spring holding the supporting ring in the locking position has to be overcome during the process of insertion.

It is therefore the object of the present invention to propose a simple locking mechanism in the case of which the interior of the receiving bore for the inner part or power take-off shaft to be received is completely free from any locking components.

SUMMARY OF THE INVENTION

The invention provides a locking mechanism for fixing an outer part on a inner part, especially the coupling sleeve of a driveshaft of an agricultural implement to the power take-off shaft of a tractor, the locking mechanism comprising locking members which are guided in apertures in the outer part so as to be movable in a radially limited way and which, in the locking position, are supported in a radially outwardly direction on an inner bore face of a movable locking ring of the locking mechanism, which locking ring is loaded by the force of a spring of the locking mechanism into the locking position, the spring acting on the one hand on the outer part and on the other hand on the locking ring, the locking members extending radially inwardly from the apertures into a receiving bore of the outer part and projecting, for fixing purposes, into a recess in the inner part, and the locking mechanism also comprising means for retaining the locking ring in an open position clear of the apertures for the locking members and for automatically cancelling the retention when the inner part is introduced into the receiving bore of the outer part, wherein the retaining means is in the form of a control ring, the control ring being movable from the locking position of the locking mechanism, with the control ring being guided over a stop projecting radially from the outer face of the outer part and axially supporting the locking ring, into the retaining position in which the locking ring is axially supported on the one end of the control ring whose other end is supported on the stop.

In a locking mechanism in accordance with the last preceding paragraph, for retaining purposes there has been provided only one single component, i.e. the control ring which is radially movable. Only a few components are required. Only one spring has to be provided for the transfer into the retaining position.

According to a further embodiment of the invention, the control ring has a circular cross-section and surrounds the outer part with play and may be moved from the locking position in which the stop holds it concentrically relative to the locking ring and the outer part into an eccentric position relative thereto by an adjusting spring acting on it radially. There is no need accurately to position the spring; it adjusts itself automatically. Finally, the control ring itself may be made of plastics.

In an alternative embodiment of the invention for retaining purposes, the control ring in the open position in the untensioned condition assumes an oval cross-section whose radius of the smaller axis is smaller than the radial extensiOn Of the stop from the axis of the outer part and upon introduction of the inner part into the receiving bore of the outer part, the radially moving locking members acting radially on the bore wall of the control ring deform the locking ring into a cross-sectional shape which is at least approximately circular and into a concentric position relative to the coupling sleeve.

In this case, the control ring itself has been given a flexible design. For being moved into the locking position the control ring must have an approximately circular shape so that it can be moved across the stop. For deforming purposes, the radial movement of the locking members is used. In a preferred embodiment, three locking members are circumferentially arranged in the apertures, thereby permitting accurate positioning.

In a further embodiment of the invention, the control ring is mounted in a groove so as to be radially movable, and the adjusting spring is mounted to act arranged between the groove base and the outer face of the control ring.

It is possible to design the groove to be part of the locking ring. Preferably, however, the groove is formed by a radial face of the locking ring and by a face of a gripping sleeve extending over the locking ring and comprising an inwardly extending web.

The adjusting spring may be designed as a helical spring, a bar spring, or a leaf spring connected to the control ring.

According to a further embodiment of the invention, it is also possible for the control ring to be connected to a flexible gripping sleeve attached to the locking ring.

The gripping sleeve may comprise an annular portion attached at one end to the locking ring and also comprising a radial web, the annular portion and/or the radial web being deformable and the web being connected to the control ring. To cause the control ring to be displaced eccentrically for the purpose of ensuring retention in the open position it is proposed that the control ring should be received in the radial web so as to be eccentric relative to the outer part.

Finally, it is proposed that the stop should be designed as a fixing ring and inserted into a groove in the outer part.

The use of the locking mechanism in accordance with the invention is not limited to fixing coupling sleeves of a driveshaft on the power take-off shaft of a tractor, but may be applied generally to components and connections to be fixed relative to each other, at least axially, with the locking mechanism having to be held in the open position to facilitate the insertion of the inner part.

BRIEF DESCRIPTION OF THE DRAWINGS

The drawings illustrate the application of the invention with reference to agricultural implements as well as various alternative embodiments of the invention.

In the drawings

DESCRIPTION OF PREFERRED EMBODIMENTS

Figure 1:
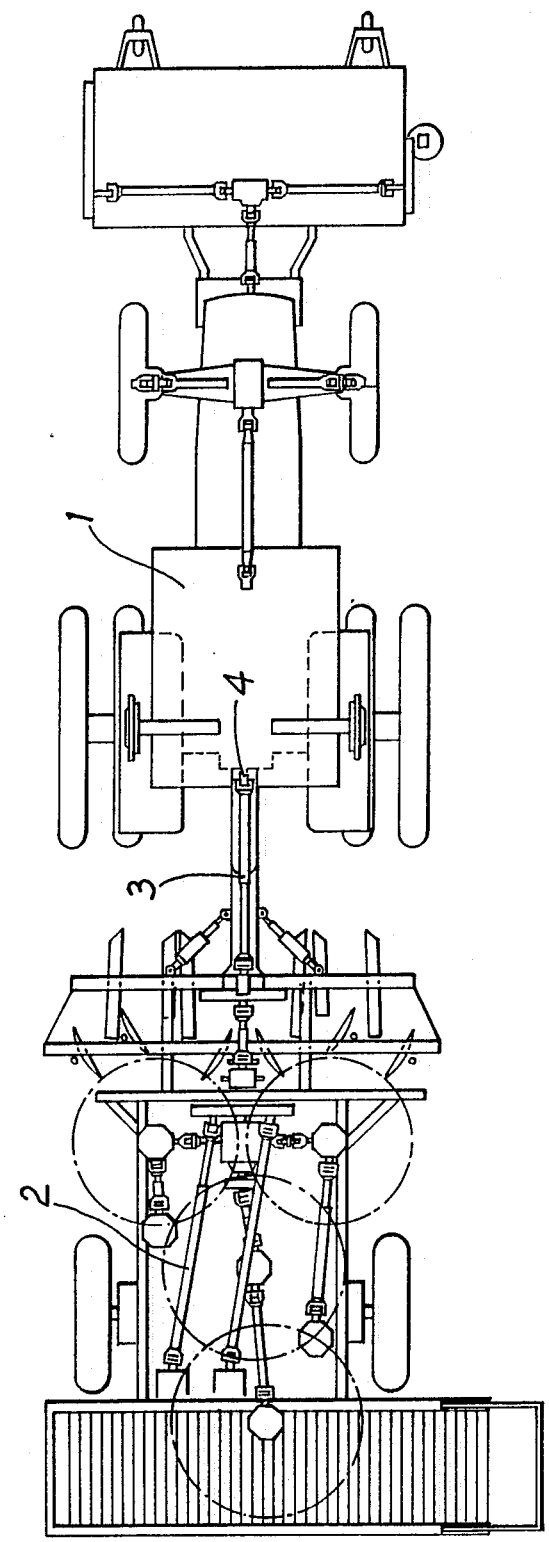
FIG. 1 is a diagrammatic plan view of an assembly of an agricultural implement and a tractor.

FIG. 1 shows a tractor with an agricultural implement attached to it. The agricultural implement 2 is a beet harvester driven by the tractor 1. For this purpose there has been provided a driveshaft 3 which, by means of a locking mechanism, is non-rotatingly and axially immovably connected to a power take-off shaft 4. FIGS. 2 to 11 illustrate alternative embodiments of the locking mechanism. For the sake of simplicity, reference is made only to the coupling sleeve 5 associated with the driveshaft 3 and the power take-off shaft 4.

Figure 2:
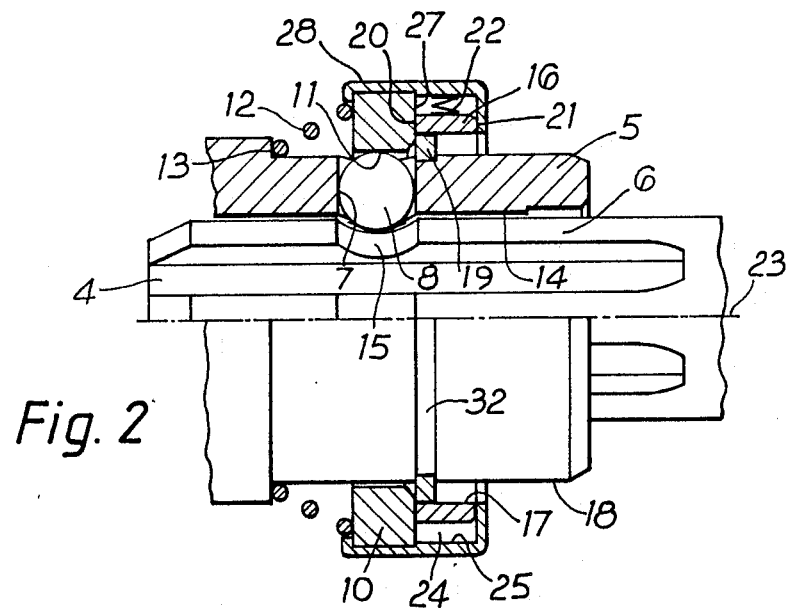
FIG. 2 is a longitudinal partially cross-sectional view of a first embodiment of the invention, showing an inserted power take-off shaft in the locked position.
Figure 3:
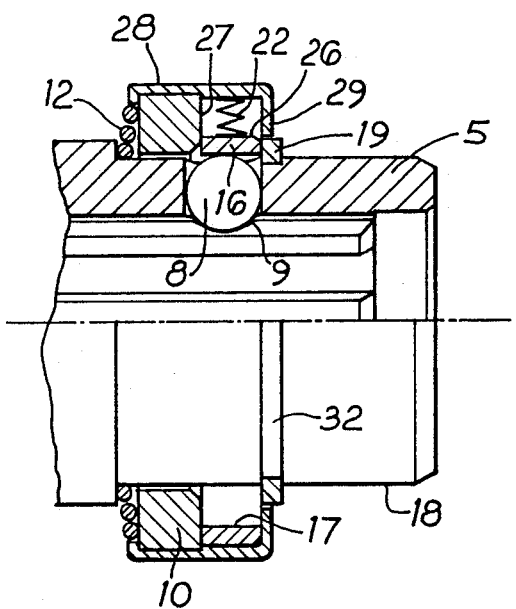
FIG. 3 is a view similar to FIG. 2 but showing the embodiment in a condition in which it is arrested in its open position.

In the case of the embodiment of FIGS. 2 and 3, the locking mechanism is shown in its locking position (FIG. 2) and in its retained open position (FIG. 3). The locking mechanism comprises the coupling sleeve 5 provided with a receiving bore 14 in which splines 6 have been provided. By means of its receiving bore 14, the coupling sleeve 5 may be slid on to the power take-off shaft 4 which comprises splines matching the splines 6 of the coupling sleeve 5. Furthermore, the power take-off shaft 4 has been provided with a recess in the form of a circumferential groove 15 which is engaged by locking members 8 of the locking mechanism in a way described below. The coupling sleeve 5 has been provided with radially extending, circumferentially distributed apertures 7 in which locking members are guided so as to be movable in a radially limited way. In the locking position, the locking members 8 (preferably there are three such locking members designed as balls) extend radially inwardly from the bores 14 into the recess 15 of the power take-off shaft so that an axially firm connection is achieved between the power take-off shaft 4 and the coupling sleeve 5. For preventing an inward radial movement in the condition where there is no power take-off shaft in the receiving bore 14, stops 9 are provided.

Furthermore, in the locking position, the locking members 8 are supported in a radially outwardly direction on the inner bore face of a locking ring 10 which, in the locking position, radially prevents the balls 8 from escaping outwardly by means of its inner bore face 11. The locking ring 10 is loaded by a force of a spring 12 into the locking position. The spring 12 has a conical shape and acts, on the one hand, on a stop face 13 of the coupling sleeve 5 and, on the other hand, on the locking ring 10. In the locking position, the locking ring is pressed against a stop 19 by the spring 12.

The locking mechanism also comprises means for retaining the locking ring 10 in the open position clear of the apertures 7 for the locking members 8 and for automatically cancelling the retention when the shaft 4 is introduced into the receiving bore of the coupling sleeve 5. The retaining means comprises a gripping sleeve 28 slid on to the locking ring 10. The gripping sleeve 28 extends laterally beyond the locking ring 10 away from the spring 12 and comprises an inwardly extending radial web 29. The radial face 27 of the locking ring 10 and the radial web 29 form a groove 24 whose groove base has been given the reference number 25. In this groove 24, a control ring 16 of the retaining means has been mounted with play relative to the outer face 18 of the coupling sleeve 5 so as to be radially movable. The control ring 16 is loaded by an adjusting spring 22 of the retaining means in the sense of an eccentric displacement relative to the coupling sleeve 5. For this purpose, the adjusting spring 22, on the one hand, is supported on the groove base 25 and, on the other hand, on the outer face 26 of the control ring 16. In the locking position, the control ring 16 is held so as to be concentric relative to the coupling sleeve 5 and the locking ring 10. In this condition, as can be seen in FIG. 2, the control ring 16, with its bore 17, is displaced beyond the outer face of the stop 19 towards the right and is held by the latter in an aligned condition. The stop 19 has been designed as a fixing ring which is inserted into a groove 32. In this position, the control ring 16 is laterally guided by the stop 19 with its one end 20 on the radial face 27 of the locking ring 10 and with its other end 21 on the radial web 29. If the locking ring 10 is pushed against the force of the spring 12 towards the left into a retaining position as illustrated in FIG. 3, it becomes possible for the locking members 8 to escape radially outwardly because the bore 17 of the control ring 16 is larger than the bore 11 of the locking ring 10. The coupling sleeve 5 may be pulled off the power take-off shaft 4. As soon as the locking members 8 are no longer supported by the power take-off shaft 4, they may escape radially inwardly until they come to rest against the stop in the aperture 7. By means of the adjusting spring 22, the control ring 16 is displaced in the groove 24 radially eccentrically relative to the axis 23 of the coupling sleeve 5 until it comes to rest against one of the locking members. In its radially displaced position, the control ring 16 reaches with its one end 21 into the region of the stop 19. As the locking ring 10, via its radial face 27, is supported on the one end 20 of the control ring 16 which, in turn, with its other end 21, is supported on the stop 19, the locking mechanism remains retained in the open position as illustrated in FIG. 3, i.e. the effect of the spring 12 relative to the axial movement of the locking ring 10 is blocked. If now an inner part or a power take-off shaft 4 is inserted into the receiving bore 14, the locking members 8 are moved radially outwardly by the outer contour of the power take-off shaft 4, with the control ring 16 being radially aligned at the same time until it again assumes a concentric position relative to the coupling sleeve 5. In this position it is possible for the spring 12 to move the locking ring 10 towards the right, and because the locking members 8 position the control ring 16, it is guided by the stop 19 until the position illustrated in FIG. 2 is reached. The control ring 16 is, thus, movable from the locking position of the locking mechanism, with the control ring 16 being guided over the stop 19 projecting radially from the outer face of the coupling sleeve 5 and axially supporting the locking ring 10, into the retaining position in which the locking ring 10 is axially supported on the one end 20 of the control ring 16 whose other end 21 is supported on the stop 19.

Figure 4:
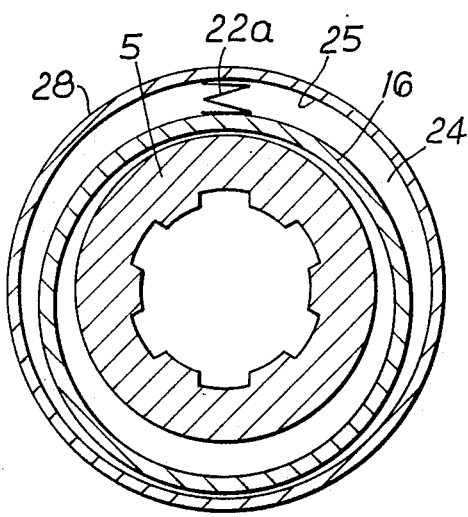
FIG. 4 is a transverse cross-sectional view of the first embodiment shown in FIGS. 3 and 4 showing a helical spring as an adjusting spring.

There are several possibilities for designing the adjusting spring 22. FIG. 4, for example, shows a helical spring 22a. Accurate positioning cannot be guaranteed. It is important to select a spring which leads to the eccentric displacement of the control ring 16 relative to the coupling sleeve 5 and the locking ring 10.

Figure 5:
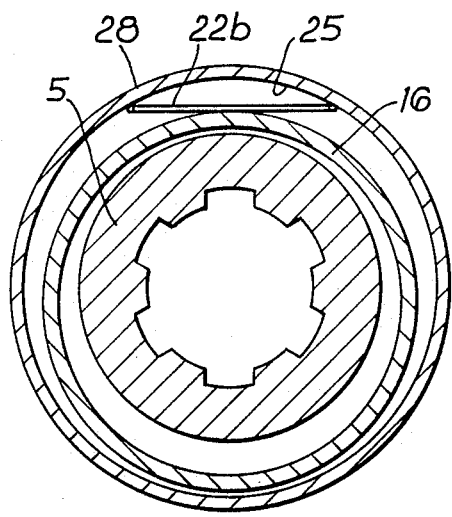
FIG. 5 is a cross-sectional view similar to FIG. 4 but showing a bar spring as an adjusting spring.

In FIG. 5, the adjusting spring 22 is a bar spring 22b whose central region is supported on the outer face 26 of the control ring 16 and whose two ends are supported on the groove base 25 of the groove 24.

Figure 6:
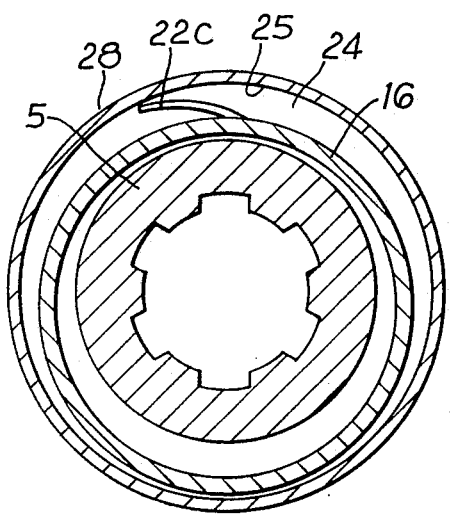
FIG. 6 is a cross-sectional view similar to FIG. 4 but showing a leaf spring as an adjusting spring.

In FIG. 6 a flexible leaf spring 22c is used as the adjusting 22, one end being connected to the control ring 16 and the other end being supported on the groove base 25 of the groove 24.

Figure 7:
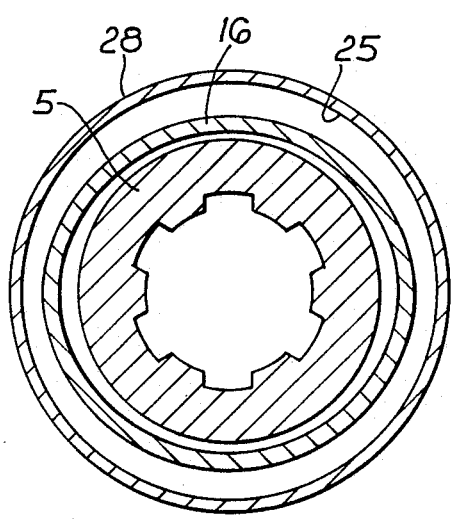
FIG. 7 is a view similar to FIGS. 4 to 6 but showing a flexible control ring which, in the untensioned condition, assumes an oval shape.

Finally, in the embodiment of FIG. 7, the control ring 16 itself has been designed to be oval-shaped, with the radius of its smaller axis being smaller than the greatest radial distance of the stop 19 from the axis 23 of the coupling sleeve 5. In this case, the control ring 16 has been designed to be elastically deformable. As the power take-off shaft 4 is introduced into the receiving bore 14 of the coupling sleeve 5, the control ring 16 is deformed by the locking members 8 from the shape shown in FIG. 7 in such a way that it assumes an approximately circular shape to be able to be moved across the stop 19 in this condition.

Figure 8:
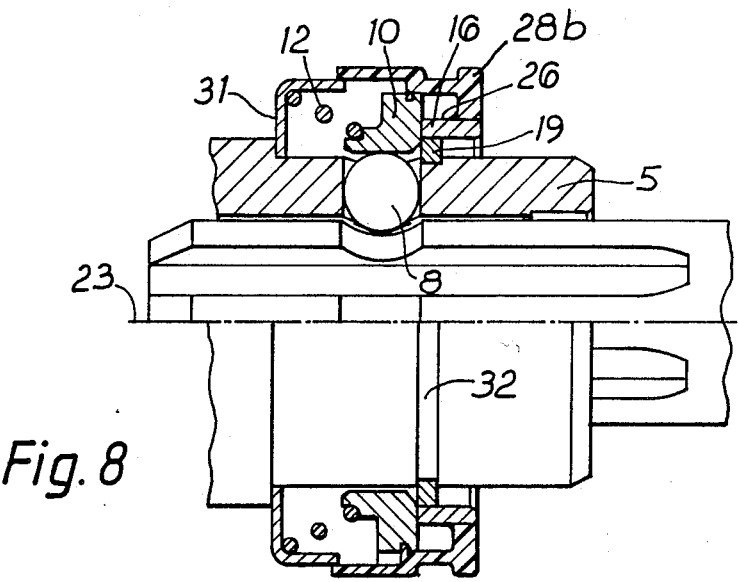
FIG. 8 is a view similar to FIG. 2 but showing a second embodiment of the invention, having an elastically deformable gripping sleeve with a control ring connected thereto.
Figure 9:
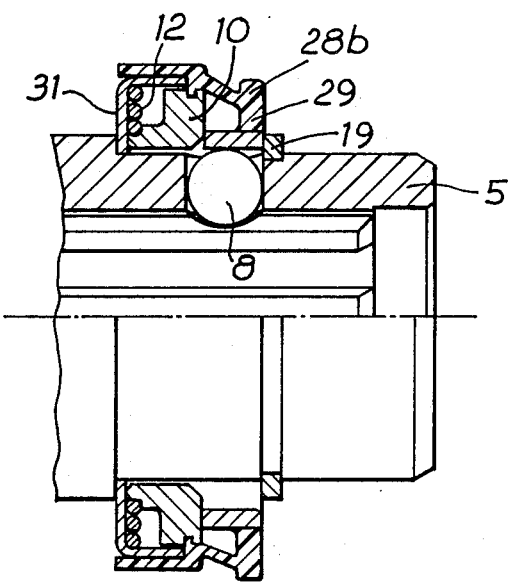
FIG. 9 is a view similar to FIG. 8 but showing the control ring with gripping sleeve in the arrested position.

FIGS. 8 and 9 show a second embodiment of the invention which is generally similar to the first embodiment but comprises an elastically deformable locking sleeve 28b which has been extended in the direction of the spring 12, with the spring 12 having a reversed conical design compared with that shown in FIG. 2, i.e. with its smaller diameter it is supported on the locking ring 10 and with its larger diameter on an additionally provided supporting sleeve 31 which is attached to the coupling sleeve 5. The locking sleeve 28b has its radial web 29 secured to the control ring 16 and acts to press the control ring downwardly viewing FIGS. 8 and 9. The locking sleeve 28b is supported on the locking ring 10. In the locked position shown in FIG. 8, the control ring 16 prevents outward movement of the locking members 8 and the control ring 16 has passed over the stop 19. To release the coupling, the locking sleeve 28b is moved towards the spring 12 (to the left viewing FIG. 8) thereby moving the control ring 16 past the stop 19. On withdrawal of the shaft 4, the resilience of the locking sleeve 28b presses the control ring 16 downwardly so that its end 21 engages the stop 19 (into the condition shown in FIG. 9). On introduction of a shaft 4, the locking members are urged outwardly causing deformation of the locking sleeve 28b and the control ring 16 to rise above the stop 19 so that the spring 12 can move it past the stop 19 (to the right viewing FIG. 9).

Figure 10:
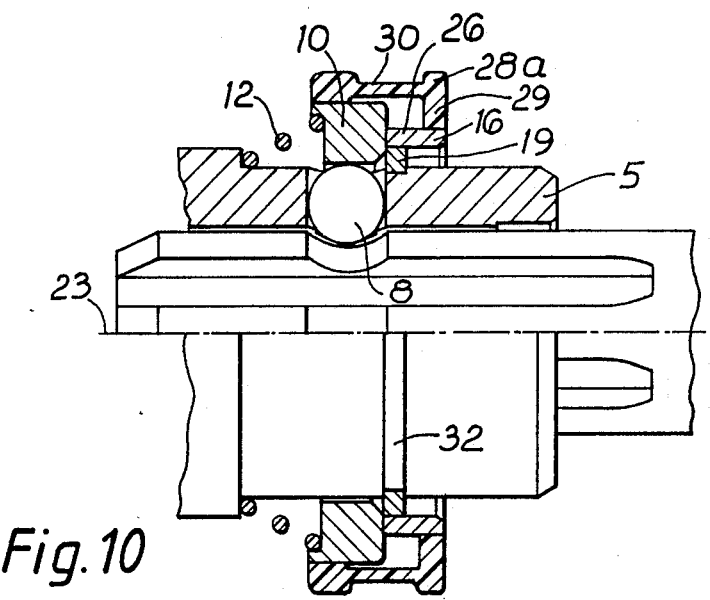
FIG. 10 is a view similar to FIG. 8 but shows a variation of the second embodiment of the invention.
Figure 11:
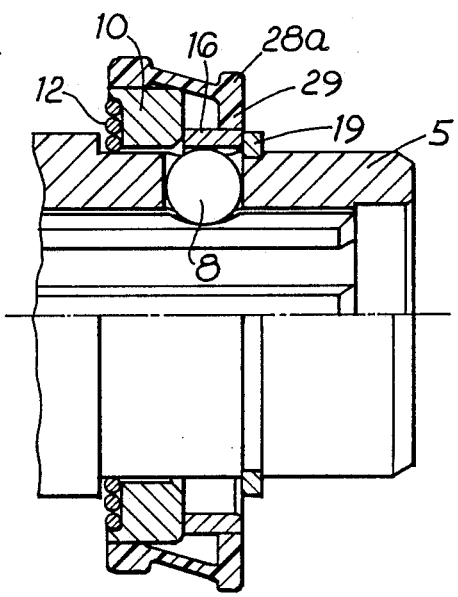
FIG. 11 is a view similar to FIG. 10 but showing the open position.

FIGS. 10 and 11 are similar to FIGS. 8 and 9 but show a variation of the second embodiment of the invention. In this case, an elastically deformable gripping sleeve 28a is elastically deformable. On the one hand, the gripping sleeve 28a is attached to the outer circumference of the locking ring 10 and with its other end it extends beyond the locking sleeve 10. This free end has been provided with a radially inwardly extending web 29.

The intermediate region has been designed as an annular region 30. The radial web 29 is firmly connected to the outer face 26 of the control ring 16. The control ring 16 is arranged eccentrically in the radial web 29 relative to the axis 23 of the coupling sleeve 5. As a result of this eccentric arrangement of the control ring 16, the gripping sleeve 28, which is elastically deformable, generates a radially extending force for the purpose of adjusting the control ring 16 relative to the locking ring 10 and the coupling sleeve 5.

We claim:

1. A locking mechanism for fixing a coupling sleeve of a drive shaft of an agricultural implement to a power take-off shaft of a tractor, the locking mechanism comprising locking members which are guided in apertures in the sleeve so as to be movable in a radially limited way and which, in a locking position, are supported in a radially outward direction on an inner bore face of a movable locking ring of the locking mechanism, which locking ring is loaded by the force of a spring of the locking mechanism into the locking position, the spring acting on the one hand on the sleeve and on the other hand on the locking ring, the locking members extending radially inward from the apertures into a receiving bore of the sleeve and projecting, for fixing purposes, into a recess in the shaft, and the locking mechanism also comprising means for retaining the locking ring in an open position clear of the apertures for the locking members and for automatically cancelling the retention when the shaft is introduced into the receiving bore of the sleeve, wherein the retaining means is in the form of a control ring, the control ring being movable from the locking position of the locking mechanism, with the control ring being guided over a stop projecting radially from the outer face of the sleeve and axially supporting the locking ring, into the retaining position in which the locking ring is axially supported on the one end of the control ring whose other end is supported on the stop, the control ring having a circular cross-section and surrounding the sleeve with play, and being movable from the locking position in which the stop holds the control ring concentrically relative to the locking ring and the sleeve, into an eccentric position relative thereto by an adjusting spring acting on it radially.

2. A locking mechanism according to claim 1, wherein the control ring is mounted in a groove so as to be radially movable and the adjusting spring is mounted to act between a groove and the outer face of the control ring wherein the groove is formed by a radial face of the locking ring and by a face of a gripping sleeve extending over the locking ring and comprising an inwardly extending web.

3. A locking mechanism according to claim 2, wherein the groove is part of the locking ring.

4. A locking mechanism according to claim 1, wherein the adjusting spring is designed as one of a helical spring, a bar spring, and a spring torque connected to the control ring.

5. A locking mechanism according to claim 1, wherein the stop is designed as a fixing ring inserted into a groove in he coupling sleeve.

6. A locking mechanism for fixing a coupling sleeve of a drive shaft of an agricultural implement to a power take-off shaft of a tractor, the locking mechanism comprising locking members which are guided in apertures in the sleeve so as to be movable in a radially limited way and which, in a locking position, are supported in a radially outward direction on an inner bore face of a movable locking ring of the locking mechanism, which locking ring is loaded by the force of a spring of the locking mechanism into the locking position, the spring acting on the one hand on the sleeve and on the other hand on the locking ring, the locking members extending radially inward from the apertures into a receiving bore of the sleeve and projecting, for fixing purposes, into a recess in the shaft, and the locking mechanism also comprising means for retaining the locking ring in an open position clear of the apertures for the locking members and for automatically cancelling the retention when the shaft is introduced into the receiving bore of the sleeve, wherein the retaining means is in the form of a control ring, and control ring being movable from the locking position of the locking mechanism, with the control ring being guided over a stop projecting radially from the outer face of the sleeve and axially supporting the locking ring, into the retaining position in which the locking ring is axially supported on the one end of the control ring whose other end is supported on the stop, for retaining purposes, the control ring in the open position in the untensioned condition assumes a closed oval cross-section whose internal radius of the smaller axis is smaller than the radial extension of the stop from the axis of the sleeve and whose internal periphery is a smooth surface, and upon introduction of the shaft into the receiving bore of the sleeve, the radially moving locking members acting radially on the bore wall of the control ring deform the locking ring into a cross-sectional shape which is at least approximately circular and into a concentric position relative to the coupling sleeve.

7. A locking mechanism according to claim 6, wherein the control ring is connected to a flexible gripping sleeve attached to the locking ring.

8. A locking mechanism according to claim 7, wherein the gripping sleeve comprises an annular portion attached at one end to the locking ring and also comprises a radial web, at least one of the annular portion and the radial web being deformable and the web being connected to the control ring.

9. A locking mechanism according to claim 8, wherein the control ring is received in the web so as to be eccentric relative to the outer part.

10. A locking mechanism according to claim 6, wherein the control ring is mounted in a groove so as to be radially movable, and the adjusting ring is mounted to act between the groove base and the outer face of the control ring.

11. A locking mechanism according to claim 10, wherein the groove is part of the locking ring.

12. A locking mechanism according to claim 10, wherein the groove is formed by a radial face of the locking ring and by a face of a gripping sleeve extending over the locking ring and comprising an inwardly extending web.

13. A locking mechanism according to claim 6, wherein the stop is designed as a fixing ring inserted into a groove in the sleeve.

* * * * *